(12) United States Patent
Yoo

(10) Patent No.: US 7,535,601 B2
(45) Date of Patent: May 19, 2009

(54) IMAGE SCANNING DEVICE FOR CONVERTING AN ANALOG SIGNAL INTO A DIGITAL SIGNAL CORRESPONDING TO AN OPERATION MODE AND A METHOD THEREOF

(75) Inventor: Si-hun Yoo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1020 days.

(21) Appl. No.: 10/925,001

(22) Filed: Aug. 25, 2004

(65) Prior Publication Data
US 2005/0117184 A1    Jun. 2, 2005

(30) Foreign Application Priority Data
Nov. 28, 2003    (KR) ............... 10-2003-0085685

(51) Int. Cl.
*H04N 1/46* (2006.01)
*H04N 1/04* (2006.01)

(52) U.S. Cl. ................... 358/474; 358/505
(58) Field of Classification Search ........... 358/474, 358/482, 483, 505, 513, 514, 530, 500, 504; 341/108, 110, 126, 144, 155, 157
See application file for complete search history.

(56) References Cited

U.S. PATENT DOCUMENTS 5,990,949 A * 11/1999 Haruki .............. 348/254
7,208,983 B2 * 4/2007 Imaizumi et al. .......... 327/94
2001/0002945 A1 * 6/2001 Watanabe et al. .......... 386/26
2002/0016833 A1 * 2/2002 Yajima et al. ............ 709/220
2004/0190038 A1 * 9/2004 Shahindoust ........... 358/1.14
2004/0260367 A1 * 12/2004 De Taboada et al. ........ 607/88

FOREIGN PATENT DOCUMENTS

| JP | 05-083558 | 4/1993 |
| JP | 07177309 | 7/1995 |
| JP | 08-286529 | 11/1996 |
| JP | 2001-109332 | 4/2001 |
| JP | 2003-324580 | 11/2003 |
| KR | 1996-009796 | 7/1996 |
| KR | 1997-078403 | 4/1999 |

* cited by examiner

*Primary Examiner*—Jerome Grant, II
(74) *Attorney, Agent, or Firm*—Roylance, Abrams, Berdo & Goodman

(57) ABSTRACT

An image scanning apparatus and method for converting analog signal into digital signal corresponding to an operation mode is disclosed. The image scanning device and method include an input unit for selectively inputting an operation mode based on a document to be scanned, an image sensor for scanning the image of the document corresponding to the selected operation mode in order to output the image as an analog image signal. The apparatus and method also include an analog to digital (A/D) unit for converting the scanned analog image signal into a digital image signal by variably applying an upper reference voltage and a lower reference voltage corresponding to the selected operation mode. The apparatus and method further include a control unit for controlling the A/D unit to convert the analog image signal into the digital image signal corresponding to the selected operation mode.

10 Claims, 4 Drawing Sheets

IMAGE SCANNING DEVICE FOR CONVERTING AN ANALOG SIGNAL INTO A DIGITAL SIGNAL CORRESPONDING TO AN OPERATION MODE AND A METHOD THEREOF

This application claims benefit under 35 U.S.C. § 119(a) from Korean Patent Application No. 2003-85685, filed on Nov. 28, 2003, the entire contents of which is incorporated herein by reference.

BACKGROUND OF THE INVENTION

1. Field of the Invention

The present invention relates generally to a device for converting an analog signal into a digital signal in an image scanning device. More particularly, the present invention relates to an image scanning device for converting an image signal scanned in analog form into an image signal in digital form corresponding to an operation mode, and an image scanning method thereof.

2. Description of the Related Art

The image scanning device is included in a digital image processing apparatus such as a scanner, a facsimile, and a digital copier, which scans the image of a given document and processes the image in the form of a digital signal. FIG. 1 is a block diagram illustrating a conventional image scanning device.

As shown in FIG. 1, the image scanning device scans the image of a document disposed on a document plate 11 by an image sensor 13. The image signal scanned in the form of an analog signal is converted into a digital image signal by an analog-to-digital (A/D) conversion unit 15. An image processing unit 17 performs the signal processing such as enlargement and reduction operations on the digital image signal and has the processed signal stored in the storage unit 19.

FIG. 2 is a block diagram illustrating the A/D conversion unit 15 of a conventional image scanning device.

The A/D conversion unit 15 sets an upper reference voltage $E_T$ and a lower reference voltage $E_B$ based on a color mode having a large accumulated light amount, and converts the analog image signal output from the image sensor 13 into the digital image signal based on the reference voltages $E_T$ and $E_B$. If the digital image signal has an 8 bit level, the lower reference voltage $E_B$ is a 0 level and the upper reference voltage $E_T$ is a 255 level. The 8 bit level of digital signal is output, which corresponds to the voltage value of the image signal input based on the voltage values corresponding to 0 through 255 levels.

When using the fixed upper reference voltage $E_T$ and the lower reference voltage $E_B$, the correct picture quality image is not obtained in the color mode and the monochrome mode. Specifically, a minimum scanning time of the monochrome mode scanned by a single light source is faster than that of the color mode scanned by Red (R), Green (G), and Blue (B) light sources, and hence the accumulated light amount in the color mode is inversely larger than that in the monochrome mode.

When applying the same upper reference voltage $E_T$ and lower reference voltage $E_B$ to the color mode and the monochrome mode each having different accumulated light amounts for converting the analog signal into a digital signal, the printed document does not have the highest image quality.

SUMMARY OF THE INVENTION

The present invention has been developed in order to solve the above drawbacks and other problems associated with the conventional arrangement. An aspect of the present invention is to provide an image scanning device and method capable of obtaining the highest image quality by varying an upper reference voltage $E_T$ and a lower reference voltage $E_B$ according to the scanning operation mode of a document.

The foregoing and other aspects and advantages are substantially realized by providing an image scanning device comprising an input unit for selectively inputting an operation mode based on a document to be scanned, an image sensor for scanning the image of the document corresponding to the selected operation mode to output it as an analog image signal. The apparatus also comprises an analog-to-digital (A/D) unit for converting the scanned analog image signal into a digital image signal by variably applying an upper reference voltage and a lower reference voltage corresponding to the selected operation mode, and a control unit for controlling the A/D unit to convert the analog image signal into the digital image signal corresponding to the selected operation mode.

The A/D unit includes a first switching unit for selecting the upper reference voltage corresponding to the selected operation mode, a second switching for selecting the lower reference voltage corresponding to the selected operation mode, and an A/D converter for converting the scanned analog image signal into the digital image signal based on the upper reference voltage and the lower reference voltage selected by the first switching unit and the second switching. The control unit controls the first switching unit and the second switching unit to switch the upper reference voltage and the lower reference voltage corresponding to the selected operation mode.

Preferably, the operation mode includes a color mode for scanning a color document and a monochrome mode for scanning a monochrome document.

An image scanning method includes the steps of selectively inputting an operation mode according to a document to be scanned, scanning the image of the document corresponding to the selected operation mode to output the image as an analog image signal. The method also comprises converting the scanned analog image signal into a digital image signal by variably applying the upper reference voltage and the lower reference voltage corresponding to the selected operation mode, and image processing the converted digital image signal in a predetermined manner.

Preferably, the A/D conversion step includes the steps of selecting the upper reference voltage corresponding to the selected operation mode, selecting the lower reference voltage corresponding to the selected operation mode, and converting the scanned analog image signal into the digital image signal based on the selected upper reference voltage and the lower reference voltage.

Accordingly, an optimal image can be obtained by converting an image signal output from the image sensor in analog form into a digital signal based on the predetermined upper and lower reference voltages corresponding to the scanning operation mode.

BRIEF DESCRIPTION OF THE DRAWING FIGURES

The above aspects and features of the present invention will be more apparent by describing certain embodiments of the present invention with reference to the accompanying drawing figures, in which.

DETAILED DESCRIPTION OF THE PREFERRED EMBODIMENTS

Certain embodiments of the present invention will be described in greater detail with reference to the accompanying drawing figures.

Figure 1:
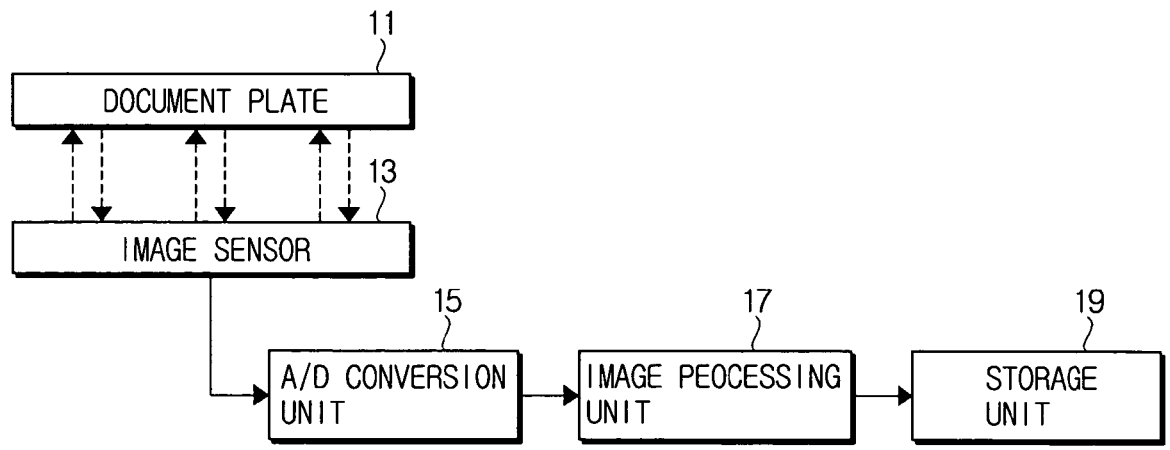
FIG. 1 is a block diagram illustrating a conventional image scanning device.
Figure 2:
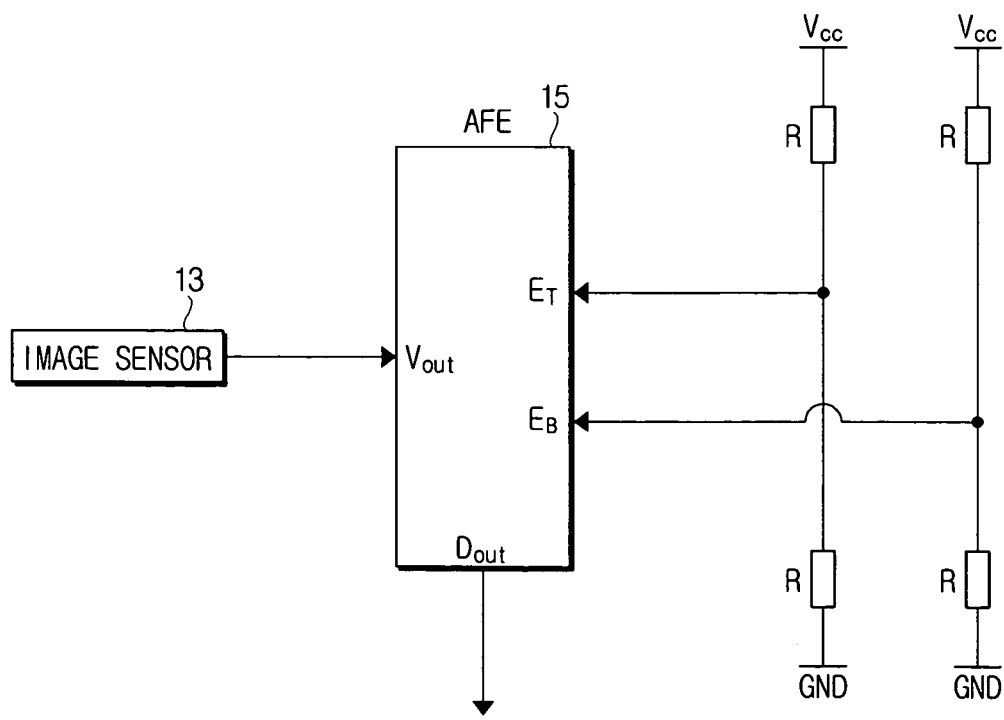
FIG. 2 is a block diagram illustrating an analog to digital (A/D) conversion unit of the image scanning device of FIG. 1.
Figure 3:
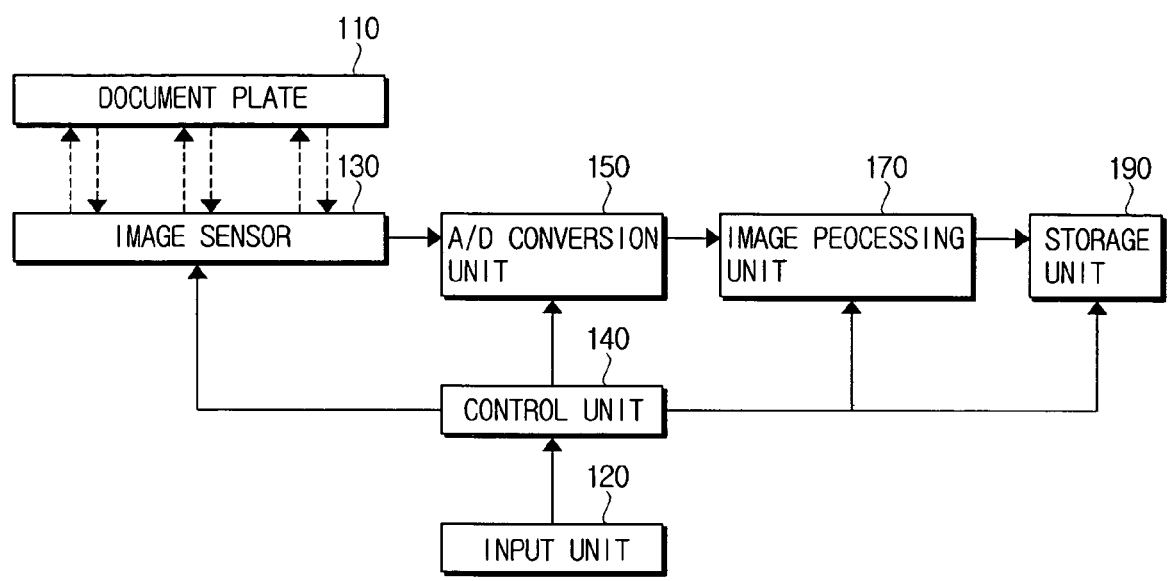
FIG. 3 is a block diagram illustrating the image scanning device according to an embodiment of the present invention.

FIG. 3 is a schematic block diagram illustrating an image scanning device according to an embodiment of the present invention.

Referring to FIG. 3, the image scanning device includes a document plate 110, an input unit 120, an image sensor 130, a control unit 140, an image processing unit 170, and a storage unit 190.

A document to be scanned is disposed on the document plate 110.

The input unit 120 is input with a user's operation command and also an operation command according to operation modes. The operation modes include a monochrome mode for scanning a monochrome document and a color mode for scanning a color document. The input unit 120 has an operation panel (not shown) provided with a plurality of operation buttons, and a display device (not shown) for displaying the current operating situation of the system.

A charge coupled device (CCD) using a halogen lamp or a fluorescent lamp as a light source, and a contact image sensor (CIS) using a light-emitting diode as a light source are used as the image sensor 130. The light illuminates the document mounted on the document plate 110, and the image of the document is scanned using the amount of light reflected from the document.

The minimum scanning time (1 line scanning time) of the color mode, which scans the image of a document using three primary colors of light Red (R), Green (G), and Blue (B), is longer than that of the monochrome mode, which scans the image of a document using a monochrome light. Accordingly, the color mode has a higher accumulated light amount during the minimum scanning time.

The image signal of the document scanned by the image sensor 130 has the voltage value (Vout) in the analog form. The voltage value for the image signal in the color mode is relatively greater than that for the image signal in the monochrome mode.

The control unit 140 controls overall operations of the image scanning device, and controls the operation of the A/D conversion unit 150 in response to the selection command of the operation mode input via the input unit 120.

The A/D conversion unit 150 converts the image signal input from the image sensor 130 in analog form, into the digital signal in digital form according to the current operation mode of the scanning device, that is, the monochrome mode or the color mode. Specifically, the upper reference voltage $E_T$ and the lower reference voltage $E_B$ are predetermined differently corresponding to the monochrome mode and the color mode, and the A/D conversion unit 150 converts an analog signal into an digital signal by selectively applying the upper reference voltage $E_T$ and the lower reference voltage $E_B$ predetermined corresponding to the current operation mode of the scanning device. The detailed description of the operations of the A/D conversion will now be explained.

The image processing unit 170 performs the signal processing such as enlargement or reduction operations, with respect to the image signal in digital form according to the user's operation command.

The storage unit 190 stores the signal-processed image signal in digital form.

It is possible to obtain the image of the document that is scanned by the digital image forming apparatus including the image scanning device of FIG. 3 from various devices. For example, the digital image forming apparatus may include a scanner, a facsimile, a duplicator, and a multipurpose device comprising a facsimile, a scanner, and a duplicator.

Figure 4:
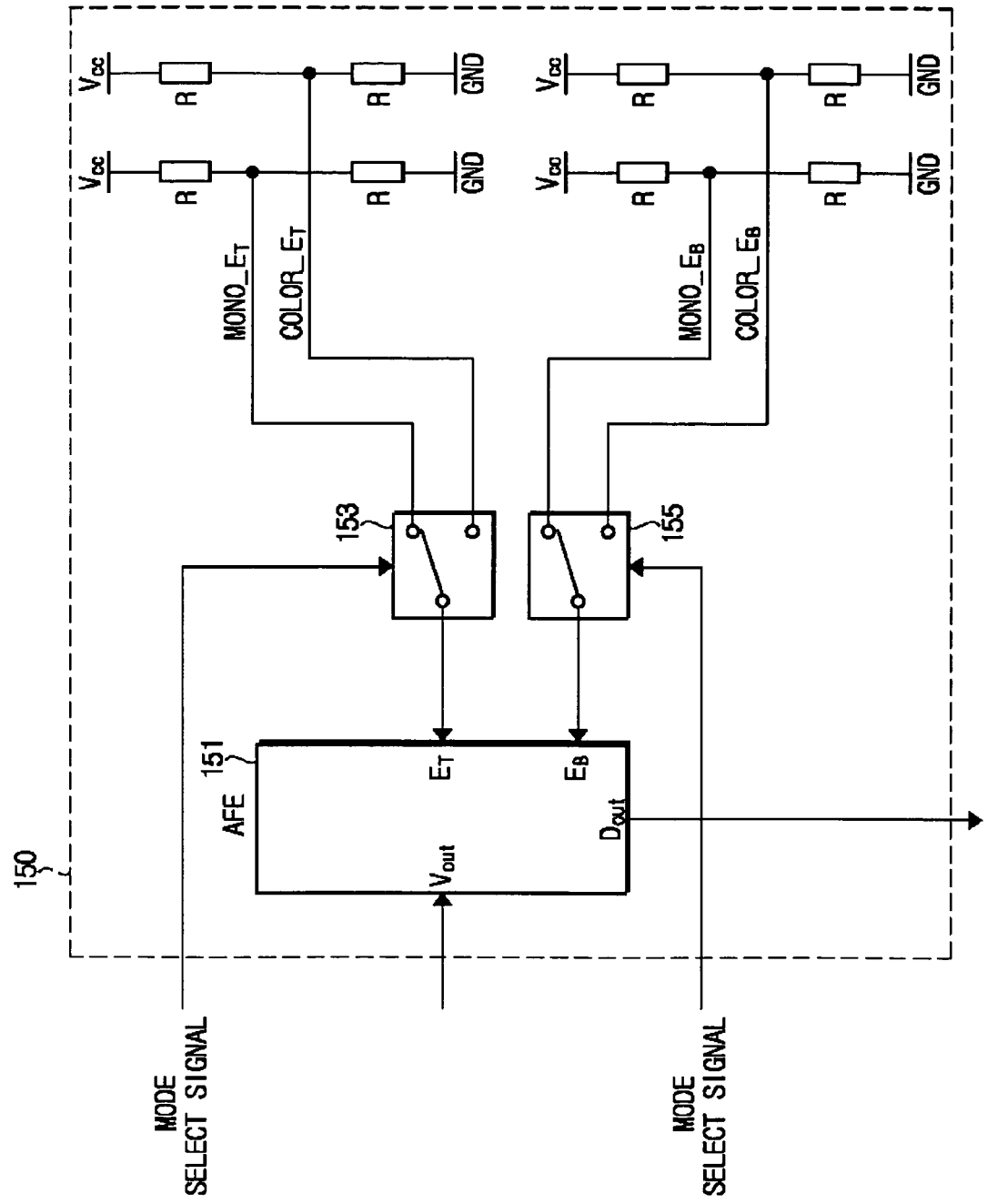
FIG. 4 is a block diagram illustrating the A/D conversion unit shown in FIG. 3 according to an embodiment of the present invention.

FIG. 4 is a block diagram illustrating the A/D conversion unit 150 according to an embodiment of the present invention. Referring to FIG. 4, the operation of the A/D conversion unit 150 is described in greater detail, which operates in different operation modes.

The A/D conversion unit 150 includes an A/D converter 151, a first switching unit 153, and a second switching unit 155.

The A/D converter 151 receives an analog voltage value (Vout) that is input as a given bit of digital signal (Dout) based on the upper reference voltage $E_T$ and the lower reference voltage $E_B$ predetermined according to the operation mode, into a digital signal of a predetermined bit. The A/D converter 151 has a prescribed number of bit terminals for outputting the given bit of digital signal (Dout). For example, if the 8-bit digital signal is output, the A/D converter 151 has the eight bit terminals $D_0$, $D_1$, up to $D_7$.

The first switching unit 153 selectively switches the upper reference voltage $E_T$ that is input to the A/D converter 151, corresponding to the operation mode. Specifically, according to the control of the control unit 140, the first switching unit 153 selects the monochrome upper reference voltage (Mono_$E_T$) if the operation mode is the monochrome mode, and the first switching unit 153 selects the color upper reference voltage (Color_$E_T$) if the operation mode is the color mode, thus providing the upper reference voltage $E_T$ corresponding to the operation mode to the A/D converter 151.

The second switching unit 155 selectively switches the lower reference voltage $E_B$ that is input to the A/D converter 151, corresponding to the operation mode. Specifically, according to the control of the control unit 140, the second switching unit 155 selects the monochrome lower reference voltage (Mono_$E_B$) if the operation mode is the monochrome mode, and the second switching unit 155 selects the color lower reference voltage (Color_$E_B$) if the operation mode is the color mode, thus providing the lower reference voltage $E_B$ corresponding to the operation mode to the A/D converter 151.

For example, in the color mode having a larger accumulated light amount by the R, G, and B light sources, the upper reference voltage (Color_$E_T$) is set to 3.3V, and the lower reference voltage (Color_$E_B$) is set to 0V. The set reference voltage 0V through 3.3V intervals are divided into a given bit of digital signal levels, and a given bit of digital image signal (Dout) corresponding to the voltage value (Vout) of color image signal that is input among the divided voltage values.

In the monochrome mode having a smaller accumulated light amount by the monochrome light source than the color mode, the upper reference voltage (Mono_$E_T$) is set to 1.5V, and the lower reference voltage (Mono_$E_B$) is set to 0V. The set reference voltage 0V through 1.5V intervals are divided into a given bit of digital signal levels, and a given bit of digital image signal (Dout) corresponding to the voltage value (Vout) of monochrome image signal that is input among the divided voltage values.

The upper reference voltage $E_T$ and the lower reference voltage $E_B$ for respective operation modes can be variously set depending on the system.

As described above, the analog voltage value (Vout) input from the image sensor 130 is converted and output into a predetermined digital signal (Dout) by respectively applying the predetermined the upper reference voltage $E_T$ and the lower reference voltage $E_B$ according to the monochrome mode and the color mode.

As a result, unlike the conventional image scanning device for performing the analog/digital conversion operation by equally applying a single reference voltage to a color mode and a monochrome mode, the image quality of the scanned document can be enhanced, because the quantization levels of the digital signals are matched to the appropriate range of input analog values based on the selected mode.

Figure 5:
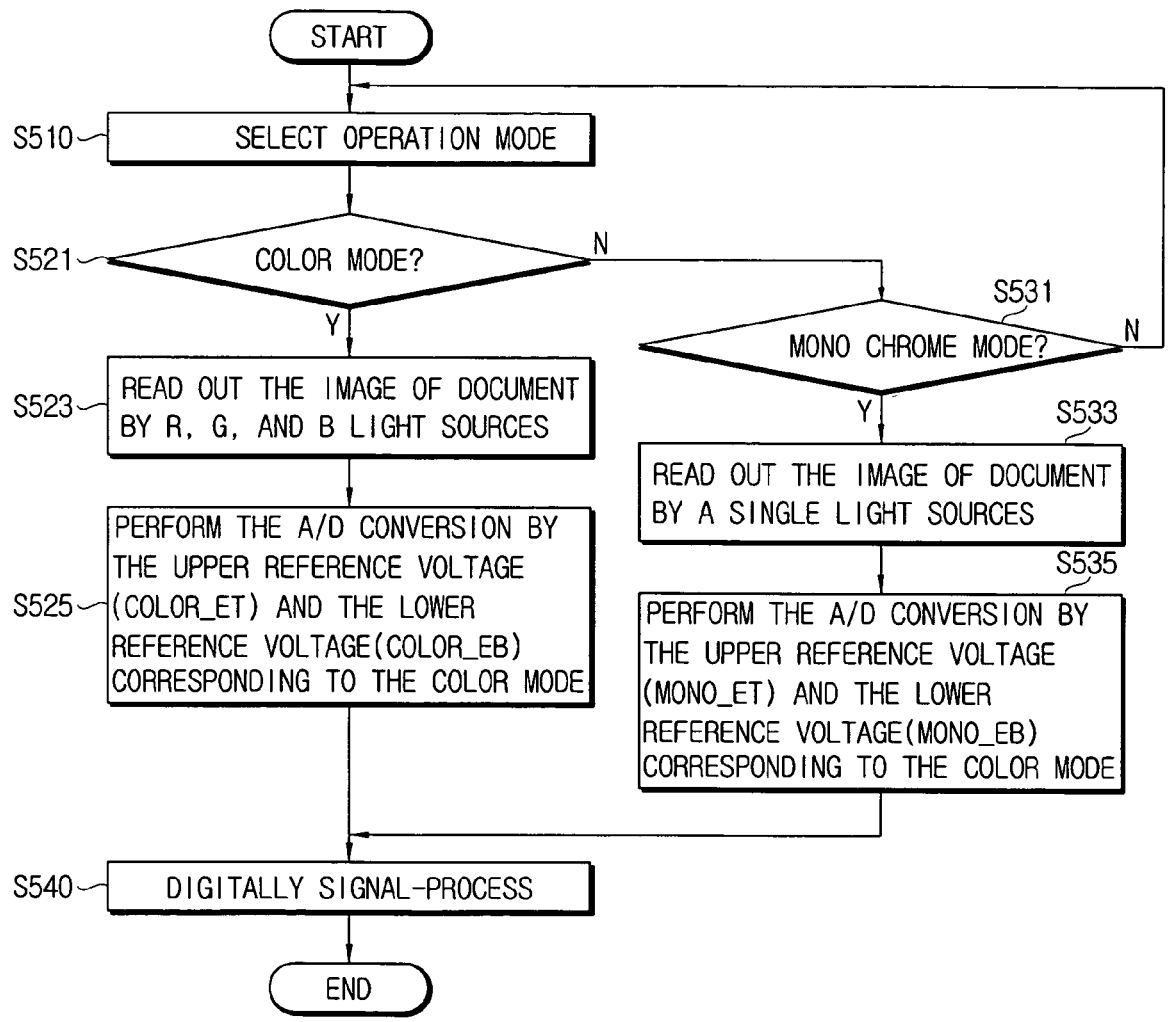
FIG. 5 is a flowchart illustrating operations of the image scanning device according to an embodiment of the present invention.

FIG. 5 is a flowchart illustrating the operations of the image scanning device according to an embodiment of the present invention. Referring to FIG. 5, a detailed description will now be provided for the image scanning method.

The user places a document to be scanned on the document plate 110 and selectively inputs the operation mode of the image scanning device via the input unit 120 at step S510.

If 'the color mode' is selected as the operation mode at step S521, the control unit 140 controls the operations of the R, G, B light sources in the image sensor 130 corresponding to the color mode, and outputs the color image of the document scanned as a predetermined voltage value (Vout) at step S523.

The voltage value (Vout) of the color image signal output from the image sensor 130 is input to the A/D conversion 150. Specifically, the voltage value (Vout) of the color image signal is input to the A/D converter 151, and at this time, the first switching unit 153 and the second switching unit 155 switch the upper reference voltage $E_T$ and the lower reference voltage $E_B$ corresponding to the color mode under the control of the control unit 140. That is, the color upper reference voltage (Color_$E_T$) and the color lower reference voltage (Color_$E_B$) are provided to the A/D converter 151. Hence, the A/D converter 151 converts and outputs the analog color image signal (Vout) that is input into the digital image signal at step S525.

If 'the monochrome mode' is selected as the operation mode by the input unit 120 at step S531, the image sensor 130 scans the image of the document using the monochrome light source according to the control of the control unit 140, and outputs the monochrome image signal of the read-out document as a predetermined voltage value (Vout) at step S533.

The voltage value (Vout) of the monochrome image signal output from the image sensor 130 is input to the A/D conversion 150. Specifically, the voltage value (Vout) of the monochrome image signal is input to the A/D converter 151, and the first switching unit 153 and the second switching unit 155 switch the upper reference voltage $E_T$ and the lower reference voltage $E_B$ corresponding to the monochrome mode under the control of the control unit 140. That is, the monochrome upper reference voltage (Mono_$E_T$) and the monochrome lower reference voltage (Mono_$E_B$) are provided to the A/D converter 151. Hence, the A/D converter 151 converts the analog monochrome image signal (Vout) into the digital image signal (Dout) at step S535.

Next, the A/D converted digital image signal is input to the image processing unit 170 and is digitally signal-processed at step S540.

As a result, an optimal image picture can be obtained by variably applying the upper and lower reference voltages $E_T$ and $E_B$ corresponding to the scanning operation mode to the image signal output from the image sensor 130 in analog form and converting the analog image signal into the digital signal.

According to the embodiments of the present invention, when converting the image signal in the scanned analog image signal by the image sensor 130 into a digital image signal, the image scanning device performs the A/D conversion for respective modes by selectively applying the predetermined upper reference voltage $E_T$ and lower reference voltage $E_B$ according to the operation mode of the image scanning device.

Thus, the embodiments of the present invention have advantages that a high quality monochrome image can be obtained in the monochrome mode, while a high quality color image can be obtained in the color mode.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An image scanning apparatus comprising:
    an input unit for selectively inputting an operation mode based on a document to be scanned;
    an image sensor for scanning the image of the document according to the selected operation mode in order to output the image as an analog image signal;
    an analog-to-digital (A/D) conversion unit for converting the scanned analog image signal into a digital image signal by variably applying an upper reference voltage and a lower reference voltage according to the selected operation mode; and
    a control unit for controlling the A/D conversion unit to convert the analog image signal into the digital image signal corresponding to the selected operation mode.

2. The apparatus of claim 1, wherein the A/D conversion unit comprises:
    a first switching unit for selecting the upper reference voltage corresponding to the selected operation mode;
    a second switching unit for selecting the lower reference voltage corresponding to the selected operation mode; and
    an A/D converter for converting the scanned analog image signal into the digital image signal based on the upper reference voltage and the lower reference voltage selected by the first switching unit and the second switching unit,
    wherein the control unit controls the first switching unit and the second switching unit to switch the upper reference voltage and the lower reference voltage according to the selected operation mode.

3. The apparatus of claim 1, wherein the operation mode comprises a color mode for scanning a color document and a monochrome mode for scanning a monochrome document.

4. The apparatus of claim 1, wherein the image scanning device comprises:
    at least one of a facsimile machine, a copier and a scanner.

5. An image scanning method comprising:
    selectively inputting operation mode according to a document to be scanned;
    scanning the image of the document corresponding to the selected operation mode in order to output the image as an analog image signal;

converting the scanned analog image signal into a digital image signal by variably applying a upper reference voltage and a lower reference voltage according to the selected operation mode; and image processing the converted digital image signal in a predetermined manner.

6. The method of claim 5, wherein the step of selectively inputting further comprises:

selecting the upper reference voltage corresponding to the selected operation mode;

selecting the lower reference voltage corresponding to the selected operation mode; and converting the scanned analog image signal into the digital image signal based on the selected upper reference voltage and lower reference voltage.

7. The method of claim 5, wherein the operation mode comprises a color mode for scanning a color document and a monochrome mode for scanning a monochrome document.

8. The method of claim 5, wherein a device for image scanning comprises: at least one of a facsimile machine, a copier and a scanner.

9. An image scanning apparatus comprising:

an input unit for selectively inputting an operation mode between a color mode for scanning a color document and a monochrome mode for scanning a monochrome document based on a document to be scanned an image sensor for scanning the image of the document according to the selected operation mode in order to output the image as an analog image signal;

an analog-to-digital (A/D) conversion unit for converting the scanned analog image signal into a digital image signal by variably applying an upper reference voltage and a lower reference voltage according to the selected operation mode; and a control unit for controlling the A/D conversion unit to convert the analog image signal into the digital image signal corresponding to the selected operation mode.

10. An image scanning method comprising:

selectively inputting an operation mode between a color mode for scanning a color document and a monochrome mode for scanning a monochrome document according to a document to be scanned;

scanning the image of the document corresponding to the selected operation mode in order to output the image as an analog image signal;

converting the scanned analog image signal into a digital image signal by variably applying a upper reference voltage and a lower reference voltage according to the selected operation mode; and image processing the converted digital image signal in a predetermined manner.

* * * * *